United States Patent
Tovchigrechko

(10) Patent No.: US 8,068,145 B1
(45) Date of Patent: Nov. 29, 2011

(54) METHOD, SYSTEMS, AND COMPUTER PROGRAM PRODUCT FOR DEMOSAICING IMAGES

(75) Inventor: Andrey Tovchigrechko, Rishon-Lezion (RU)

(73) Assignee: Pixim Inc., Mountain View, CA (US)

( * ) Notice: Subject to any disclaimer, the term of this patent is extended or adjusted under 35 U.S.C. 154(b) by 560 days.

(21) Appl. No.: 12/244,125

(22) Filed: Oct. 2, 2008

(51) Int. Cl.
*H04N 5/228* (2006.01)
(52) U.S. Cl. .................................. 348/222.1
(58) Field of Classification Search ............... 348/222.1
See application file for complete search history.

(56) References Cited

U.S. PATENT DOCUMENTS

| 6,809,765 | B1* | 10/2004 | Tao | 348/273 |
| 2002/0122586 | A1* | 9/2002 | Hel-Or et al. | 382/162 |
| 2006/0279585 | A1* | 12/2006 | Milanfar et al. | 345/694 |
| 2010/0085452 | A1* | 4/2010 | Hirakawa et al. | 348/273 |

* cited by examiner

*Primary Examiner* — James Hannett
(74) *Attorney, Agent, or Firm* — Reches Patents

(57) ABSTRACT

A system for demosaicing an image that is acquired by a color sensor, the system includes: (i) an interface for receiving intensity values for pixels of the image; wherein the intensity value of each pixel is indicative of an amount of light that was detected by a chromatically filtered sensing element of the color sensor; and (ii) a processor configured to: (a) calculate at least one chrominance value for a pixel in response to intensity values of neighboring pixels; and (b) compute a luminance value for the pixel in response to the at least one chrominance value of the pixel and to an intensity value of the pixel; wherein the processor is further configured to carry out the calculating and the computing for each pixel of a group of pixels of the image.

14 Claims, 14 Drawing Sheets

| G | R | G | R | G | R | G | R |
|---|---|---|---|---|---|---|---|
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |

Prior Art

FIG. 1

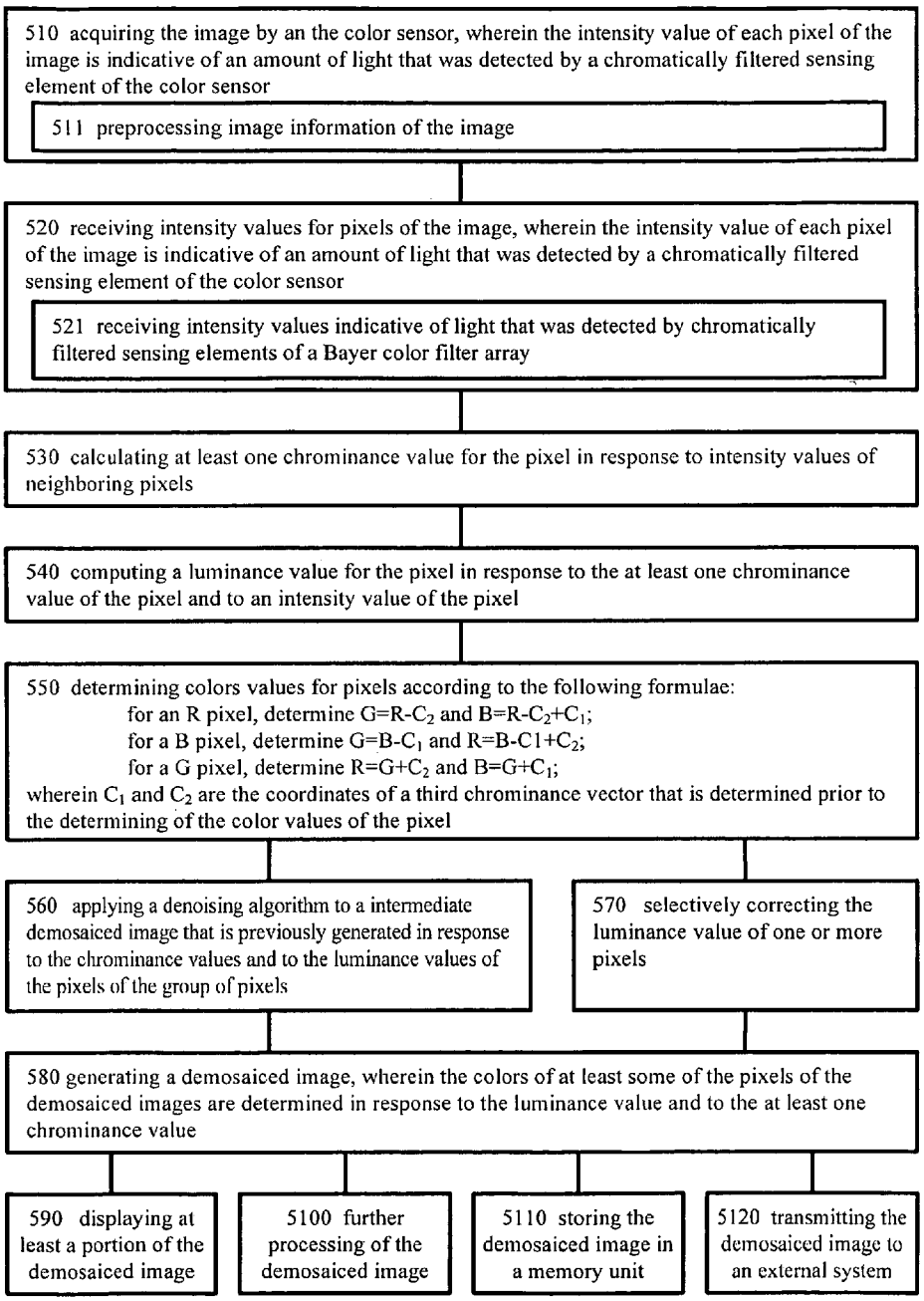

510 acquiring the image by an the color sensor, wherein the intensity value of each pixel of the image is indicative of an amount of light that was detected by a chromatically filtered sensing element of the color sensor 511 preprocessing image information of the image 520 receiving intensity values for pixels of the image, wherein the intensity value of each pixel of the image is indicative of an amount of light that was detected by a chromatically filtered sensing element of the color sensor 521 receiving intensity values indicative of light that was detected by chromatically filtered sensing elements of a Bayer color filter array 530 calculating at least one chrominance value for the pixel in response to intensity values of neighboring pixels 540 computing a luminance value for the pixel in response to the at least one chrominance value of the pixel and to an intensity value of the pixel 550 determining colors values for pixels according to the following formulae:
for an R pixel, determine $G=R-C_2$ and $B=R-C_2+C_1$;
for a B pixel, determine $G=B-C_1$ and $R=B-C1+C_2$;
for a G pixel, determine $R=G+C_2$ and $B=G+C_1$;
wherein $C_1$ and $C_2$ are the coordinates of a third chrominance vector that is determined prior to the determining of the color values of the pixel 560 applying a denoising algorithm to a intermediate demosaiced image that is previously generated in response to the chrominance values and to the luminance values of the pixels of the group of pixels 570 selectively correcting the luminance value of one or more pixels 580 generating a demosaiced image, wherein the colors of at least some of the pixels of the demosaiced images are determined in response to the luminance value and to the at least one chrominance value 590 displaying at least a portion of the demosaiced image 5100 further processing of the demosaiced image 5110 storing the demosaiced image in a memory unit 5120 transmitting the demosaiced image to an external system

500     FIG. 3A 530 calculating at least one chrominance value for the pixel in response to intensity values of neighboring pixels 531 calculating the at least one chrominance value for the pixel in response to values of neighboring pixels that are consisted in a 5x5 disc of pixels, wherein the pixel is located at a center of the 5x5 disc 532 determining a first chrominance vector that is responsive to differences between intensity values of pixels of each horizontal pair of adjacent pixels out of the neighboring pixels 5321 determining the coordinates of first chrominance vector to be $$\overline{C}_{hor} = \left( \frac{1}{n} \sum_{h=1..n} BG_{hor}[h], \frac{1}{m} \sum_{l=1..m} RG_{hor}[l] \right)$$

533 determining a second chrominance vector that is responsive to differences between intensity values of pixels of each vertical pair of adjacent pixels out of the neighboring pixels 5331 determining the coordinates of second chrominance vector to be $$\overline{C}_{vert} = \left( \frac{1}{p} \sum_{r=1..p} BG_{vert}[r], \frac{1}{q} \sum_{s=1..q} RG_{vert}[s] \right)$$

534 determining the least one chrominance value in response to the first chrominance vector, to the second chrominance vector, and to gray color reference 5341 determining a value of a coefficient coefficient k so as to minimize a distance between C and a gray color reference, wherein $0 \leq k \leq 1$ 5342 of determining two chrominance values that are the components of the vector $C = C_{hor} + k \cdot (C_{vert} - C_{hor})$

FIG. 3B 540 computing a luminance value for the pixel in response to the at least one chrominance value of the pixel and to an intensity value of the pixel 541 computing the luminance value according to the following formulae:
for an R pixel, determine luminance = (pixel intensity value) - $C_2$;
for a B pixel, determine luminance = (pixel intensity value) - $C_1$;
for a G pixel, determine luminance = (pixel intensity value);
wherein $C_1$ and $C_2$ are the coordinates of a third chrominance vector that is determined prior to the determining of the color values of the pixel 570 selectively correcting the luminance value of one or more pixels 571 computing the luminance for all the pixels in the subgroup of adjacent pixels 572 determining a variance value and offset values for each pattern type of a group of pattern types in response to the luminance values of the pixels of the subgroup of adjacent pixels 573 determining, in response to the variance values and the offset values of the pattern types, a probable pattern type 574 evaluating a requisiteness of a correction for the probable pattern type 575 selectively correcting the luminance value of a center pixel of the subgroup of adjacent pixels

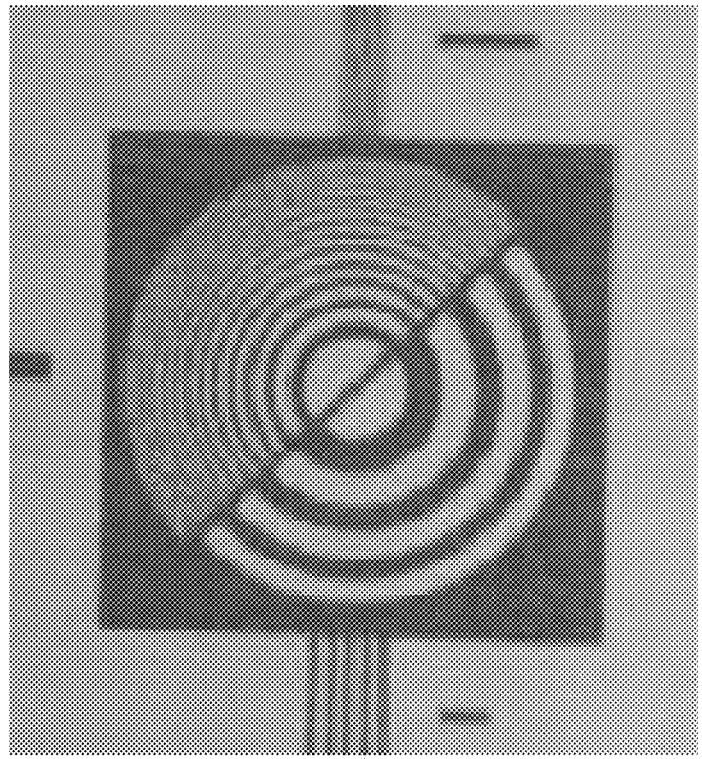
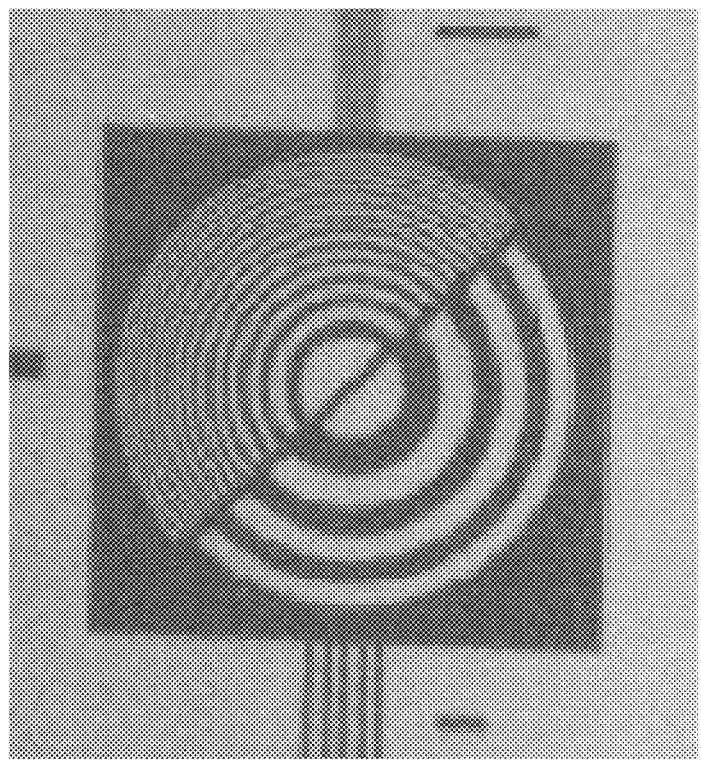
FIG. 7

|   | 1 | 2 | 3 |   |
|---|---|---|---|---|
| 4 | 5 | 6 | 7 | 8 |
| 9 | 10 | 11 | 12 | 13 |
| 14 | 15 | 16 | 17 | 18 |
|   | 19 | 20 | 21 |   |

METHOD, SYSTEMS, AND COMPUTER PROGRAM PRODUCT FOR DEMOSAICING IMAGES

FIELD OF THE INVENTION

The invention relates to methods, systems and computer program products for demosaicing images, and especially to methods, systems, and computer program products for demosaicing an image that is acquired by a color sensor.

BACKGROUND OF THE INVENTION

Commonly in digital imaging, color images that include color information for each pixel are generated from several color layers, wherein each of the layers includes only information acquired by a group of chromatically filtered sensor elements, wherein the sensing elements of the different groups of chromatically filtered sensing elements are located next to each other, in a process known as demosaicing.

Since in every location (which corresponds to a pixel of the final image), only partial color information that is acquired by a chromatically filtered sensing element is available, interpolation of the data of other sensing elements is required for a generation of a complete color image from the partial raw data received from the chromatically filtered sensing elements. It is noted that the process of demosaicing may be carried out either by a digital camera that acquire the sensor information, or on another platform (e.g. a personal computer).

While chromatically filtered sensing elements may be achieved in different manners (e.g. creating photosensitive sensing elements that are sensitive only or mainly to a certain portion of the visual spectrum), the most common technique of implementing chromatically filtered sensing elements in digital photography which is commonly used is the use of color filter arrays (CFA), which are located in front of an array of substantially identical sensing elements, wherein each sensing element receives light that is chromatically filtered by a certain portion of the CFA.

It is noted that different color sensors implement different filtering mosaics, wherein a relatively small pattern of chromatically filtered sensing elements (e.g. a 2×2 or a 4×4 pixels in a pattern) is repeated over a grid of pixels. Some known patterns are the Bayer filter using a recurring 2×2 pattern of three types of color filters (referred to as R, G, and B, as being generally related to Red, Green, and Blue channels); an RGBE filter that uses a recurring 2×2 pattern of four types of color filters (referred to as R, G, B, and E, as being generally related to Red, Green, Blue and Emerald channels); a CYYM filter that uses a recurring 2×2 pattern of three types of color filters (referred to as C, Y, and M, as being generally related to Cyan, Yellow, and Magenta channels), and so forth. It is noted that other patterns are larger (e.g. a 4×4 RGBW pattern that was developed by Kodak, and in which the W is generally related to a "White" channel). Additionally, it should be noted that other types of patterns that are not square grids have been offered and implemented.

FIG. 1 illustrates a Bayer filter pattern. It is noted that the Bayer filter pattern includes twice as much G chromatically filtered sensing elements compared to the number of B and G chromatically filtered sensing elements. It should be noted that when implemented, the different types of chromatically filtered sensing elements may be sensitive to more than one portion of the optical spectrum.

Colors of pixels in a color image are usually denoted using tuples of three or four components, that corresponds to different standards. Some standards use the component of the tuple to represent colors (e.g. red, green, and blue in the RGB model), while other use other representation (e.g. for chrominance and luminance).

Referring to some representations that utilize luminance and chrominance (also: luma and chroma), one component (or axis) represents luminance, and two other components of the tuple (or axes of the color space) represent chrominance; for example: YUV, YCbCr, (R/4+G/2+B/2, 3*R/4−G/2−B/4, −R/4−G/2+3*B/4), (G, R-G, B-G), (G, R/G, B/G). In last two examples the G channel is treated as luminance and color differences/ratios are treated as chrominance.

It is noted that during a process of demosaicing, several problems are known to arise in prior art solutions. For example, a problem of aliasing may arise, in which false colors are visible in high frequency areas. For example, in high frequency areas of pure black-and-white image, blue and yellow colors may be clearly visible in the demosaiced image. Most demosaicing algorithms transfer these false colors to the result image.

Several prior art demosaicing methods are known in the art, some of which are:

a. Anisotropic demosaicing methods, such as (a) bilinear interpolation (in which each missed value is estimated as a linear combination of neighbor pixels of the same color); (b) bi-median interpolation (in which each missed value is estimated as a median of neighbor pixels of the same color), and (c) spline interpolation (in which missed color values are interpolated by using local polynomial approximation).

b. Direction-sensing methods; this group of methods analyzes signal variance in several directions (up, down, left, right; sometimes diagonals). Missed color values are copied then from the neighbor pixels located in directions of smallest variance. 'La Roche-Prescott', 'Hamilton-Adams', 'Pattern Recognition', 'Pixels Grouping', 'Variable Number of Gradients' are known algorithms of this type (all of them are published in the Internet).

c. Filtration of false colors. This group of methods tries to filter out false colors by using chroma filters or by applying certain restrictions to chroma components. These algorithms, at first, estimate RGB colors by using some other method, then convert RGB to Luminance and Chrominance, and then refine the chrominance. 'Smooth Hue Transition', 'Freeman' are known algorithms of this type (all of them are published in the Internet).

d. Correlation between color layers. Most advanced methods of demosaicing are based on the assumption that all picture Layers (R-layer, G-layer, B-layer) are heavily correlated. These algorithms, at first, estimate G color by using some other method, then derive RB from G, then adjust G by using RB, then adjust RB by using G and so on. The number of iterations is between 3 and 8, or even more. 'POCS' (also known as 'Alternative Projections'), 'Optimal Recovery' are known algorithms of this type (they are published in the Internet).

It is noted that some algorithms (such as those mentioned above) are not used in CMOS sensors today, because it is difficult to make a number of iterations in the ISP pipeline.

SUMMARY OF THE INVENTION

A method for demosaicing an image that is acquired by a color sensor, the method includes: (i) receiving intensity values for pixels of the image, and (ii) carrying out, for each pixel of a group of pixels of the image, the stages of: (a) calculating at least one chrominance value for the pixel in response to intensity values of neighboring pixels; and (b) computing a luminance value for the pixel in response to the at least one chrominance value of the pixel and to an intensity value of the pixel; wherein the intensity value of each pixel is indicative of an amount of light that was detected by a chromatically filtered sensing element of the color sensor.

A system for demosaicing an image that is acquired by a color sensor, the system includes: (i) an interface for receiving intensity values for pixels of the image; wherein the intensity value of each pixel is indicative of an amount of light that was detected by a chromatically filtered sensing element of the color sensor; and (ii) a processor configured to: (a) calculate at least one chrominance value for a pixel in response to intensity values of neighboring pixels; and (b) compute a luminance value for the pixel in response to the at least one chrominance value of the pixel and to an intensity value of the pixel; wherein the processor is further configured to carry out the calculating and the computing for each pixel of a group of pixels of the image.

A computer readable medium, having a computer readable code embodied therein for demosaicing an image that is acquired by a color sensor, the computer readable code includes instructions for: (i) receiving intensity values for pixels of the image, and (ii) carrying out, for each pixel of a group of pixels of the image, the stages of: (a) calculating at least one chrominance value for the pixel in response to intensity values of neighboring pixels; and (b) computing a luminance value for the pixel in response to the at least one chrominance value of the pixel and to an intensity value of the pixel; wherein the intensity value of each pixel is indicative of an amount of light that was detected by a chromatically filtered sensing element of the color sensor.

BRIEF DESCRIPTION OF THE DRAWINGS

The foregoing and other objects, features, and advantages of the present invention will become more apparent from the following detailed description when taken in conjunction with the accompanying drawings. In the drawings, similar reference characters denote similar elements throughout the different views, in which:

FIG. 1 illustrates a Bayer filter pattern;

FIGS. 3A through 3C illustrate a method for demosaicing an image that is acquired by a color sensor, according to an embodiment of the invention;

FIG. 7 is an illustration of a result of the proposed solution, according to an embodiment of the invention, and a typical result of another demosaicing algorithm for a similar test target; and FIG. 8 illustrate a subgroup of pixels, according to an embodiment of the invention.

DETAILED DESCRIPTION OF THE DRAWINGS

Figure 2A:
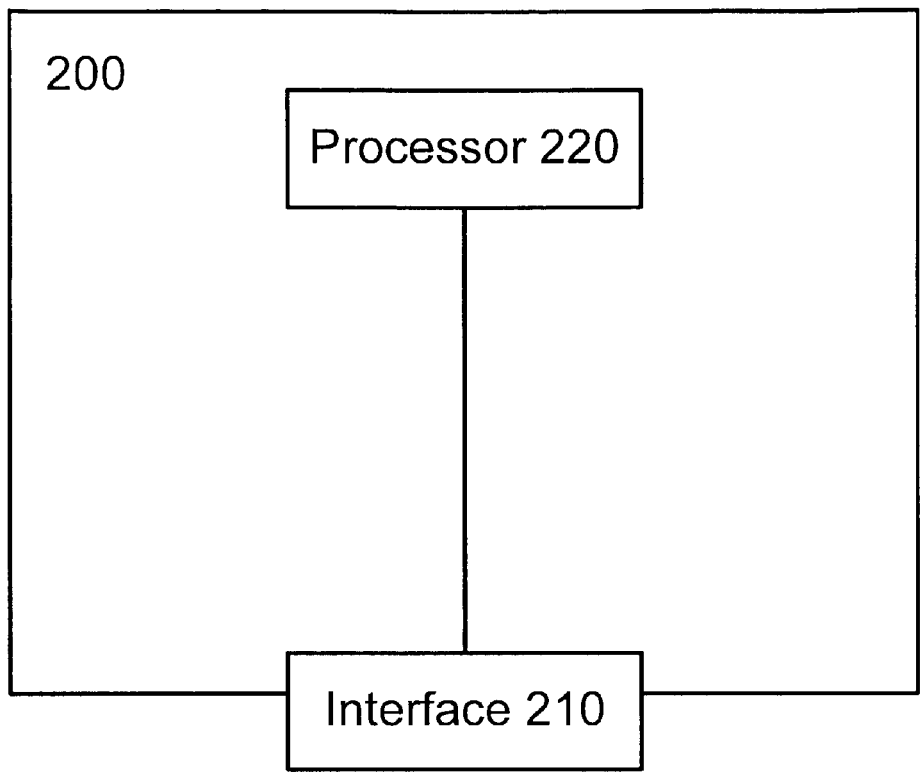
FIGS. 2A and 2B illustrate systems for demosaicing an image that is acquired by a color sensor, according to different embodiments of the invention.
Figure 2B:
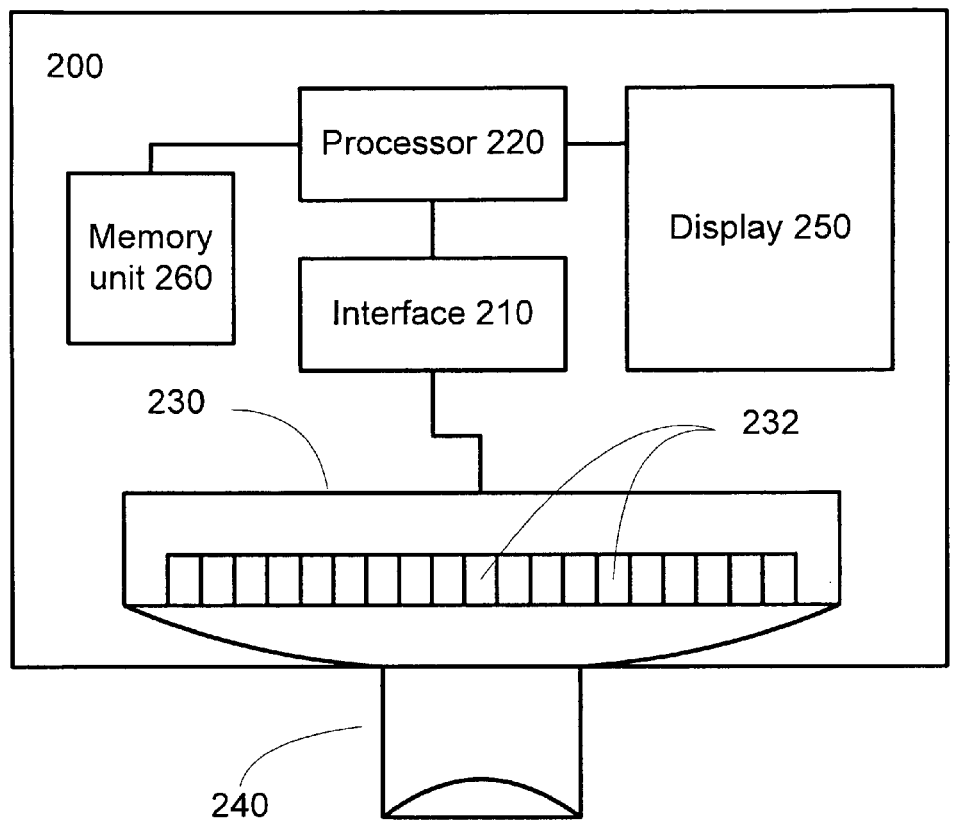

FIGS. 2A and 2B illustrate system 200 for demosaicing an image that is acquired by a color sensor, according to different embodiments of the invention. System 200 includes interface 210 for receiving intensity values for pixels of the image; wherein the intensity value of each pixel is indicative of an amount of light that was detected by a chromatically filtered sensing element of the color sensor; and processor 220 configured to: (a) calculate at least one chrominance value for a pixel in response to intensity values of neighboring pixels; and (b) compute a luminance value for the pixel in response to the at least one chrominance value of the pixel and to an intensity value of the pixel; wherein processor 220 is further configured to carry out the calculating and the computing for each pixel of a group of pixels of the image.

It is noted that conveniently system 200 and different embodiments of which are adapted to carry out method 500 discussed below, and different embodiments of method 500. A continuation of a description of system 200 follows the description of method 500 which may, according to an embodiment of the invention, be carried out by which.

FIGS. 3A through 3C illustrate method 500 for demosaicing an image that is acquired by a color sensor, according to an embodiment of the invention. Referring to the examples set forth in the drawings, it is noted that method 500 and different embodiments of which may conveniently be carried out by system 200 and different embodiments of which, and vise versa.

According to an embodiment of the invention, method 500 starts with stage 510 of acquiring the image by an the color sensor, wherein the intensity value of each pixel of the image is indicative of an amount of light that was detected by a chromatically filtered sensing element of the color sensor.

According to an embodiment of the invention, stage 510 may include stage 511 of preprocessing image information of the image. It is noted that the preprocessing may be carried out according to different embodiments of the invention either in a camera that includes the color sensor, or in an external system.

Method 500 starts (or continues) with stage 520 of receiving intensity values for pixels of the image, and carrying out, for each pixel of a group of pixels of the image, stages 530 and 540, wherein the intensity value of each pixel of the image is indicative of an amount of light that was detected by a chromatically filtered sensing element of the color sensor. It is noted that the receiving is conveniently carried out by a processing unit that may be either included in a camera that includes the color sensor, or which is external to it. It is further noted that the receiving by the processing unit may include a receiving of the intensity values from an intermediating unit (e.g. a storage unit), and not directly from the color sensor, even though this is not necessarily so.

According to an embodiment of the invention, stage 520 includes stage 521 of receiving intensity values indicative of light that was detected by chromatically filtered sensing elements of a Bayer color filter array.

It should be noted that stages 530 and 540 include computing chrominance and luminance values for each pixel of the group of pixels. It is clear to a person who is skilled in the art that different definitions of chrominance and luminance may be implemented according to different embodiments of the invention. For example, the chrominance and luminance definitions used may include normalizing, factoring (by a number or a function), adapting to certain system, and so forth.

Several aspects of the proposed algorithm which are implemented in different embodiments of the invention and that should be noted are:

a. While effective chrominance resolution may decrease to an extent; luminance layer is restored without any resolution loss.

b. Chrominance is restored at first, and then Luminance is derived from the input Bayer image and the calculated Chrominance.

As is known to a person who is skilled in the art, prior art demosaicing algorithms restore luminance and chrominance with reduced effective resolution, and either restore luminance and chrominance simultaneously or alternatively restore luminance first and then derive chrominance from the input image and from the calculated luminance. As will be further clear to a person who is skilled in the art, the order of deriving the chrominance and then the luminance as well as the lossless restoration of luminance offer many advantages of the proposed algorithm over prior art demosaicing techniques.

Referring now back to stages 530 and 540 that are carried for each pixel of the group of pixels, stage 530 includes calculating at least one chrominance value for the pixel in response to intensity values of neighboring pixels, and stage 540 includes computing a luminance value for the pixel in response to the at least one chrominance value of the pixel and to an intensity value of the pixel.

It is noted that according to an embodiment of the invention in which stage 521 is implemented (where the pixels of the image match a Bayer pattern), some definitions which may be used for chrominance and luminance are:

a. Luminance=G; and
b. Chrominance=(B-G, R-G)=($C_1$, $C_2$), where $C_1$=B-G, and $C_2$=R-G.

That is, according to an embodiment of the invention (either implementing the Bayer pattern or not), the chrominance may be treated as a vector having two (or more, in other cases) components, each of which is one of the chrominance values calculated at stage 530. It is however noted that this is not necessarily so.

Figure 4A:
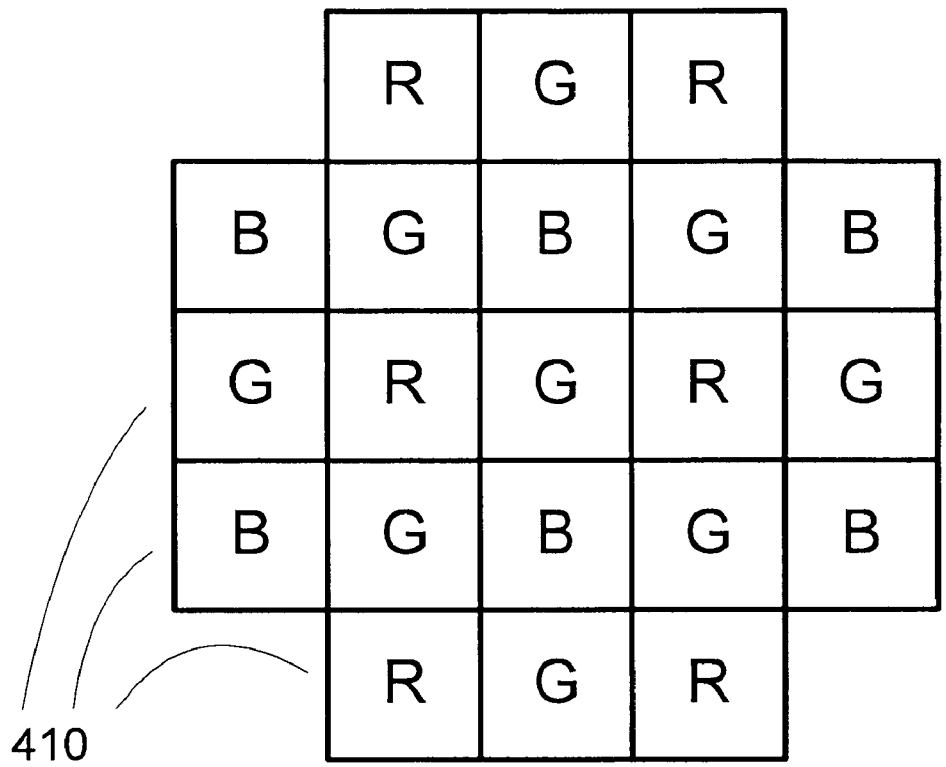
FIG. 4 illustrate a 5×5 disc of pixels, according to an embodiment of the invention.

Referring now to stage 530, according to an embodiment of the invention, the calculating includes stage 531 of calculating the at least one chrominance value for the pixel in response to values of neighboring pixels arranged as a 5×5 disc of pixels (such as pixels 410 that are arranged as a disc 400 illustrated in FIG. 4A), wherein the pixel is located at a center of the 5×5 disc. It is clear that other neighborhoods of pixels may be implemented according to different embodiments of the invention, which may either have or not have different kinds of symmetry in relation to the pixel. Additionally, it should be noted that the calculating may involve different kinds of neighborhoods of pixel for the calculating of the chrominance values of different pixels, wherein the calculating may be preceded by a stage of determining the neighborhood of neighboring pixels that will be used for calculating the at least one chrominance value for the pixel.

According to an embodiment of the invention, the calculating includes stages 532, 533, and 534, wherein stage 532 includes determining a first chrominance vector that is responsive to differences between intensity values of pixels of each horizontal pair of adjacent pixels out of the neighboring pixels; stage 533 includes determining a second chrominance vector that is responsive to differences between intensity values of pixels of each vertical pair of adjacent pixels out of the neighboring pixels; and stage 534 includes determining the least one chrominance value in response to the first chrominance vector, to the second chrominance vector, and to gray color reference.

Referring to stages 532 and 533 of determining the first and second chrominance vectors, according to an embodiment of the invention in which stage 521 is implemented, stage 532 includes stage 5321 of determining the coordinates of the first chrominance vector to be:

$$\overline{C_{hor}} = \left( \frac{1}{n} \sum_{h=1,n} BG_{hor}[h], \frac{1}{m} \sum_{l=1,m} RG_{hor}[l] \right);$$

and stage 533 includes stage 5331 of determining the coordinates of the second chrominance vector to be:

$$\overline{C_{vert}} = \left( \frac{1}{p} \sum_{r=1,p} BG_{vert}[r], \frac{1}{q} \sum_{l=1,q} RG_{vert}[s] \right).$$

In the notation used above, in the neighboring pixels there are n horizontal B-G pairs of the Bayer color filter array; m horizontal R-G pairs; p vertical B-G pairs; and q vertical R-G pairs of the Bayer color filter array, wherein:

a. for each of n horizontal B-G pairs of the Bayer color filter array included in the neighboring pixels, $BG_{hor}[h]$ is equal to a difference between an intensity value of a B pixel of a B-G pair to an intensity value of a G pixel of the B-G pair, where h is an index of summation ranging from 1 to n;

b. for each of m horizontal R-G pairs of the Bayer color filter array included in the neighboring pixels, $RG_{hor}[l]$ is equal to a difference between an intensity value of a R pixel of a R-G pair to an intensity value of a G pixel of the R-G pair, where l is an index of summation ranging from 1 to m;

c. for each of p vertical B-G pairs of the Bayer color filter array included in the neighboring pixels, $BG_{vert}[r]$ is equal to a difference between an intensity value of a B pixel of a B-G pair to an intensity value of a G pixel of the B-G pair, where r is an index of summation ranging from 1 to p;

d. for each of q vertical R-G pairs of the Bayer color filter array included in the neighboring pixels, $RG_{vert}[s]$ is equal to a difference between an intensity value of a R pixel of a R-G pair to an intensity value of a G pixel of the R-G pair, where s is an index of summation ranging from 1 to q.

Figure 4B:
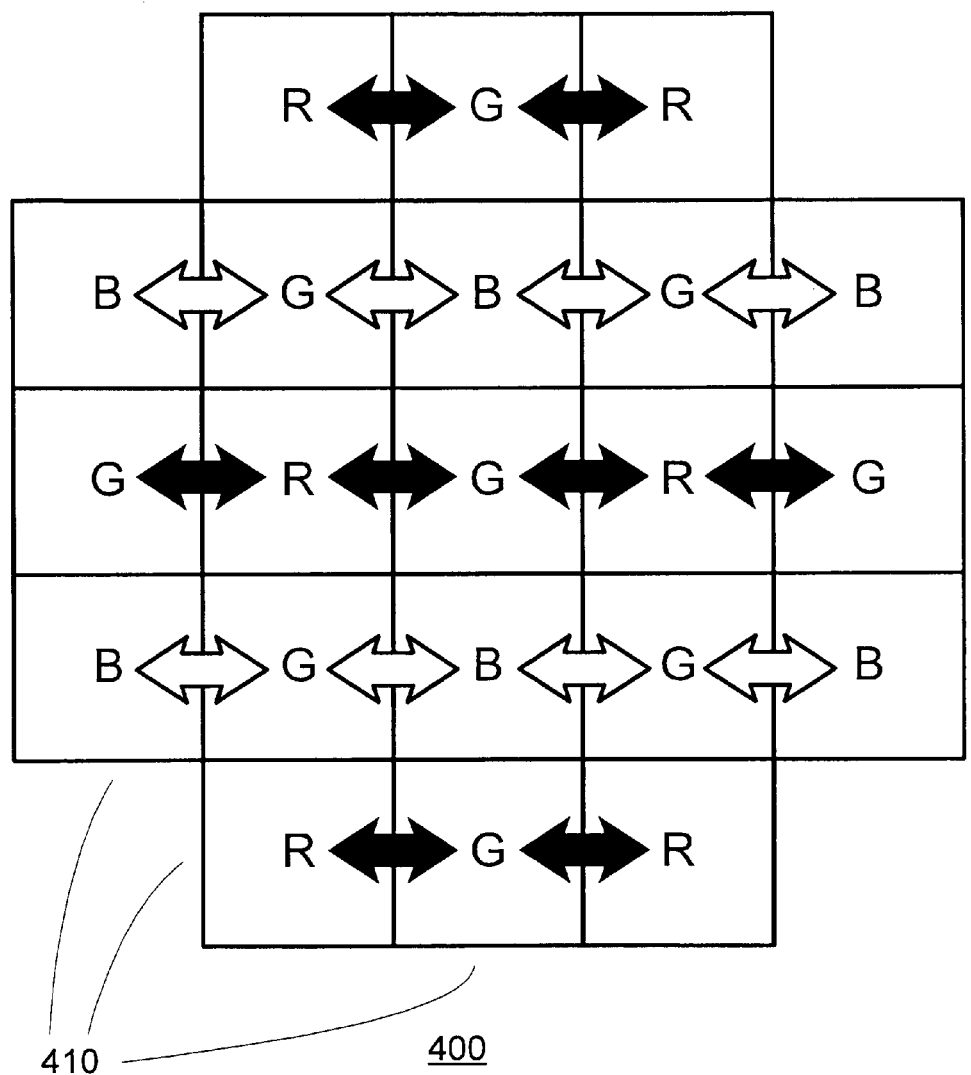
Figure 4C:
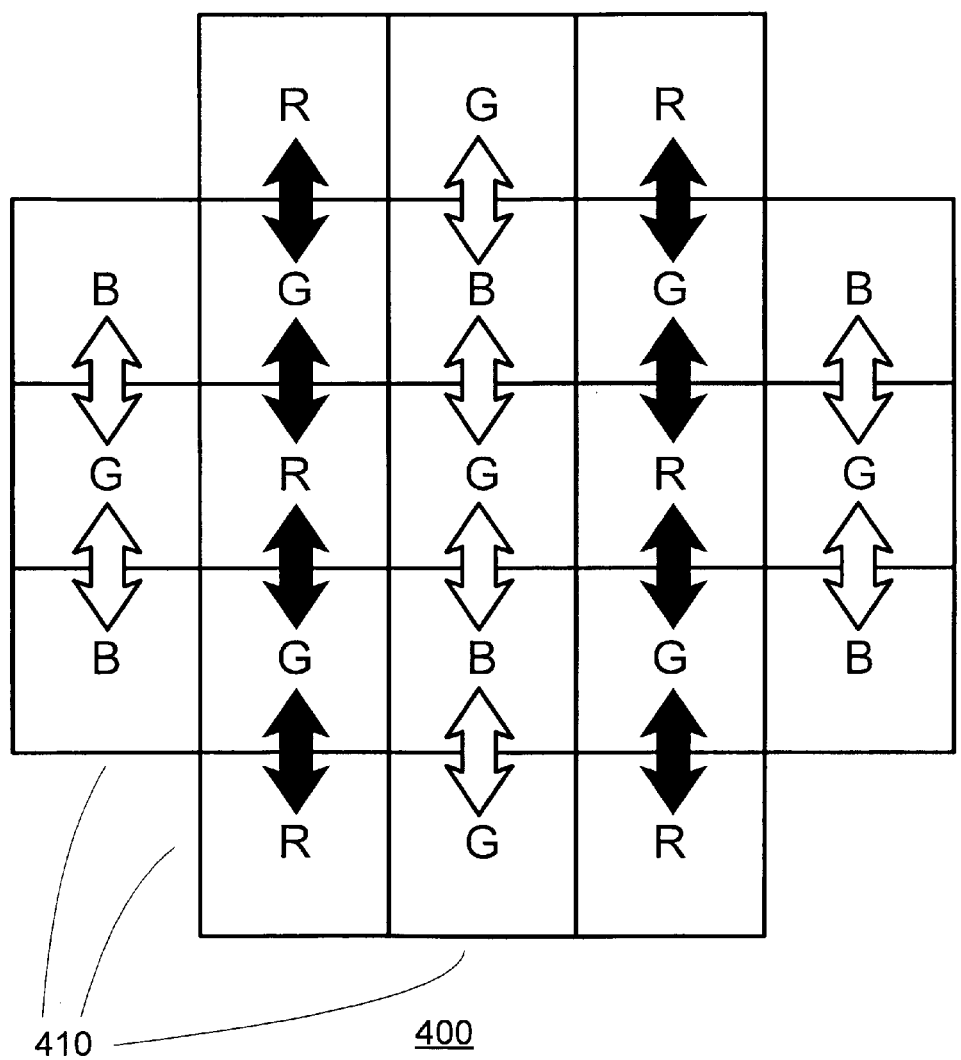

For example, referring to the example of stage 531 (for which the illustration of FIG. 4a is related), there are over all 16 horizontal pairs of pixels (as illustrated in FIG. 4B), of which there are 8 horizontal R-G pairs (denoted with black arrows), and 8 horizontal B-G pairs (denoted with empty arrows). Likewise, there are over all 16 vertical pairs of pixels (as illustrated in FIG. 4C), of which there are 8 vertical R-G pairs (denoted with black arrows), and 8 vertical B-G pairs (denoted with empty arrows).

Continuing the same example, the first chrominance vector may be determined to be $$\overline{C_{hor}} = \left( \frac{1}{8} \sum_{k=1...8} BG_{hor}[k], \frac{1}{8} \sum_{l=1...8} RG_{hor}[l] \right),$$

while the second chrominance vector may be determined to be $$\overline{C_{vert}} = \left(\frac{1}{8}\sum_{r=1...8} BG_{vert}[r], \frac{1}{8}\sum_{s=1...8} RG_{vert}[s]\right).$$

According to an embodiment of the invention, the at least one chrominance value is two chrominance values that are two coordinates of a third chrominance vector $$\overline{C}$$

that is defined as a linear combination between the first chrominance vector $$\overline{C_{hor}}$$

and the second chrominance vector $$\overline{C_{vert}},$$

so that $$\overline{C} = \overline{C_{hor}} + k \cdot (\overline{C_{vert}} - \overline{C_{hor}}),$$

wherein, according to such an embodiment of the invention, the calculating may include stage 5341 of determining a value of a coefficient k∈[0,1] so as to minimize a distance between $$\overline{C}$$

and a gray color reference, wherein stage 5341 is followed by stage 5342 of determining two chrominance values that are the components of the third chrominance vector $$\overline{C} = \overline{C_{hor}} + k \cdot (\overline{C_{vert}} - \overline{C_{hor}}).$$

Figure 5A:
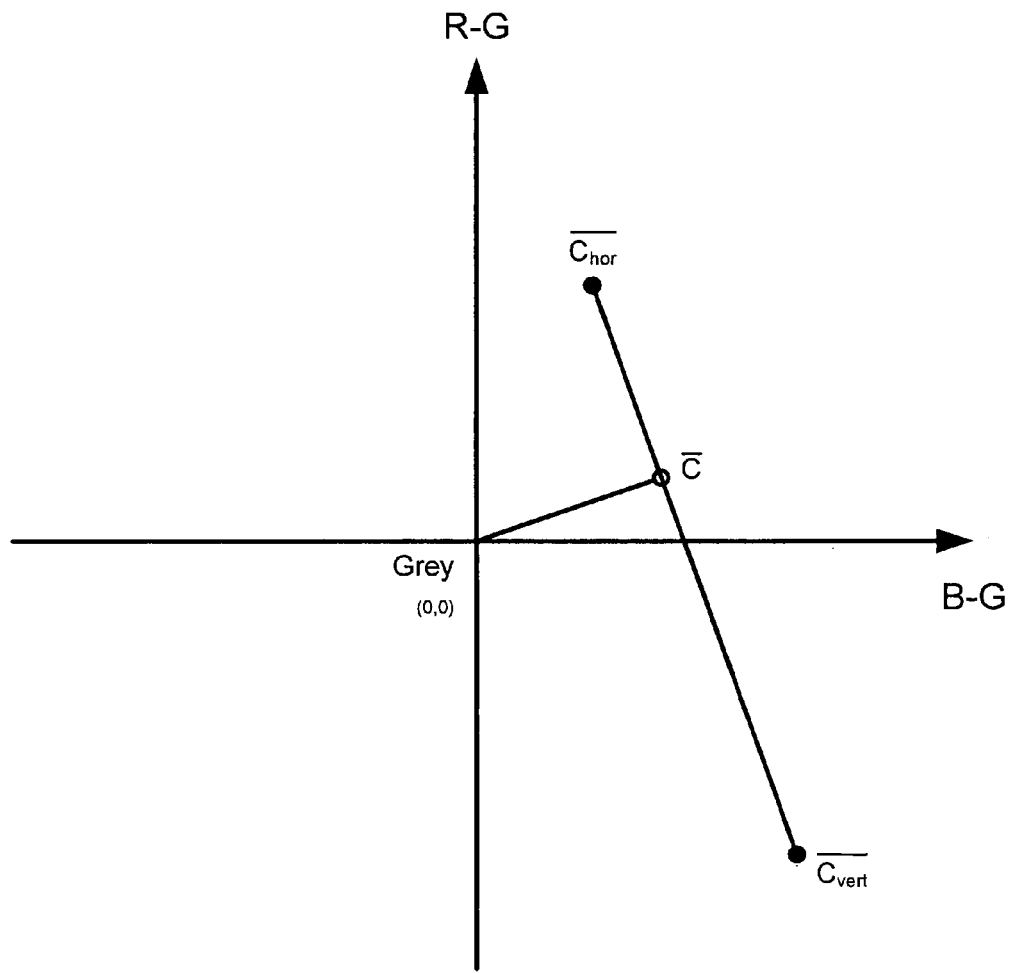
FIGS. 5A and 5B illustrate a calculating of chrominance value according to an embodiment of the invention.
Figure 5B:
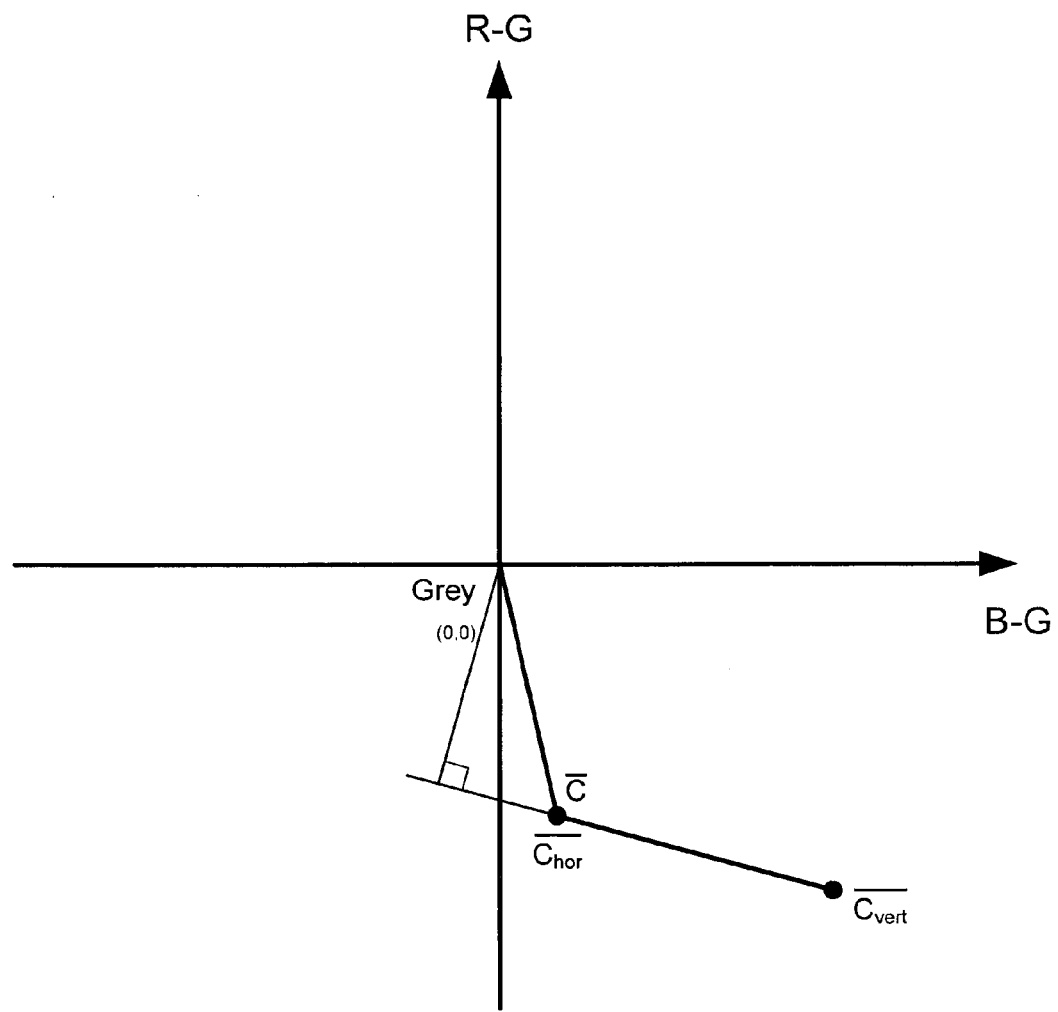

Referring to FIGS. 5A and 5B, which illustrate a calculating of chrominance value according to an embodiment of the invention in which stages 531, 532, 5321, 533, 5331, 534, 5341, and 5342 are implemented. In the illustrated embodiment, the definitions which are used for chrominance and luminance are:
 a. Luminance=G; and
 b. Chrominance=(B-G, R-G)=($C_1$, $C_2$), where $C_1$=B-G, and $C_2$=R-G.

As could be seen from the illustrations, once $$\overline{C_{hor}}$$

and $$\overline{C_{vert}}$$

are calculated according to stages 5321 and 5331, a linear line connecting the two can be determined. According to the herein disclosed embodiment of the invention, the third chrominance vector $$\overline{C}$$

is computed to be the point on the segment $$\overline{C_{hor}}$$

to $$\overline{C_{vert}}$$

which is closest to the origin (which is grey color, having a null chrominance in each of the chrominance components). As could be seen in FIG. 5B, if the closest point to (0,0) chrominance on the infinite line connecting $$\overline{C_{hor}}$$

and $$\overline{C_{vert}}$$

is not between those two points, one of these points that is closer to (0,0) chrominance is selected, according to the exemplified embodiment of the invention. It is noted that in the exemplified embodiment, Euclidian distance was implemented, and that other embodiments may implement other types of metrics (especially if the chrominance and/or luminance parameters are normalized etc.).

Referring back to FIGS. 3A through 3C, which illustrate method 500 according to an embodiment of the invention, stage 540 includes computing the luminance value for the pixel in response to the at least one chrominance value of the pixel and to an intensity value of the pixel.

It should be noted that the invention enables a restoration of the luminance value (and thus, according to an embodiment of the invention, also of color component tuples—e.g. triplets—such as RGB components) using only the intensity value of the pixel, if the at least one chrominance value is known.

Referring to a three dimensional color space (e.g. RGB or luminance$^x$chrominance$^2$) and to two calculated chrominance values, such a restoration is possible because three coordinates in the 3D color space are known—two chrominance values, and intensity value of the current pixel.

It should be further noted that, using method 500, the luminance value that is computed for each pixel does not depend on neighboring pixels (i.e. except to the extent in which the at least one chrominance value depends on neighboring pixels), which facilitates the limiting or resolving problems of blurring (which are characteristic of prior art demosaicing algorithms).

According to an embodiment of the invention, the computing of the luminance value for the pixel is irrespective of intensity values of other pixels of the image (albeit being dependant on at least one chrominance values, which are calculated—according to the stages discussed above—using the intensity values of neighboring pixels).

According to an embodiment of the invention, in which stage 521 is implemented (where the pixels of the image match a Bayer pattern), method 500 includes stage 550 of determining colors values for pixels according to the following formulae:

for an R pixel, determine $G=R-C_2$ and $B=R-C_2+C_1$;
for a B pixel, determine $G=B-C_1$ and $R=B-C1+C_2$;
for a G pixel, determine $R=G+C_2$ and $B=G+C_1$;
wherein $C_1$ and $C_2$ are coordinates of a third chrominance vector (which is conveniently third chrominance vector $\bar{c}$ which is determined as disclosed above) that is determined prior to the determining of the color values of the pixel.

As aforementioned, according to an embodiment of the invention the definitions which are used for chrominance and luminance are: (a) luminance=G; and (b) Chrominance=(B-G, R-G), and accordingly, according to an embodiment of the invention, stage 540 includes stage 541 of computing the luminance value according to the following formulae:

for an R pixel, determine luminance=(the pixel's intensity value)$-C_2$;
for a B pixel, determine luminance=(the pixel's intensity value)$-C_1$;
for a G pixel, determine luminance=(the pixel's intensity value);
wherein $C_1$ and $C_2$ are coordinates of a third chrominance vector (which is conveniently third chrominance vector $\bar{c}$ which is determined as disclosed above) that is determined prior to the determining of the color values of the pixel.

According to an embodiment of the invention, method 500 further includes stage 560 of applying a denoising algorithm to an intermediate demosaiced image that is previously generated in response to the chrominance values and to the luminance values of the pixels of the group of pixels. It is noted that the generating of the intermediate demosaiced image in response to the chrominance values and to the luminance values of the pixels of the group of pixels may include the carrying out, for each pixel of the group of pixels of the image, stages 530 and 540.

It should be noted that for the great majority of cases executing the previous stages of method 500 is sufficient for restoring a quality color image. It is however possible that in some situations—e.g. some test charts—mistakes in chrominance calculation result in certain patterns in the luminance layer generated according to the stages disclosed above. Such patterns may occur on horizontal lines, on vertical lines, or covering some area of the image.

Figure 6:
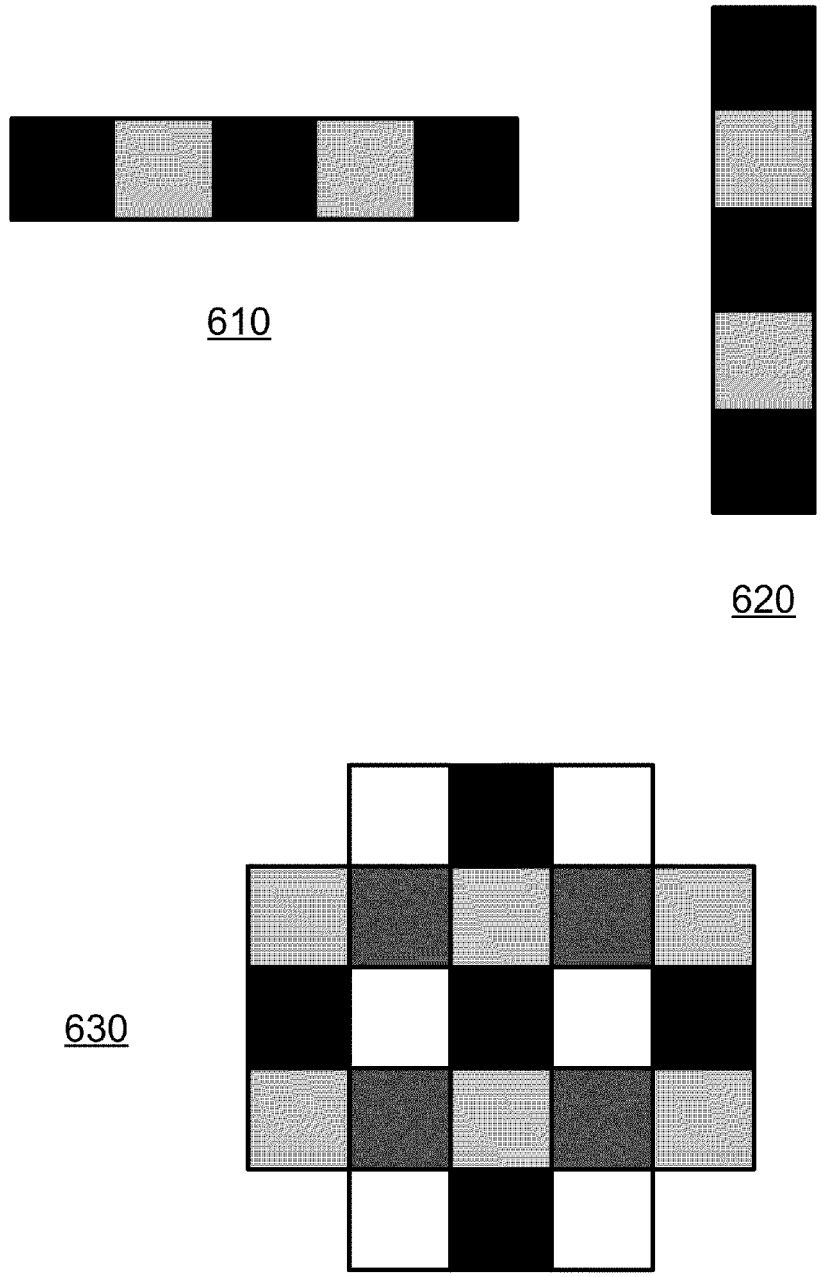
FIG. 6 illustrates possible patterns in luminance layer that may follow an inaccurate calculation of chrominance values, according to an embodiment of the invention.

FIG. 6 illustrates possible patterns in luminance layer that may follow an inaccurate calculation of chrominance values, according to an embodiment of the invention, wherein first pattern type 610 is horizontal, second pattern type 620 is vertical, and third pattern type 630 is an area pattern.

These patterns can be corrected in various ways. For example, according to an embodiment of the invention, denoising is integrated to demosaicing, which facilitates the clearing of such (or other types of) patterns by a denoising algorithm.

However, according to an embodiment of the invention, a stand-alone solution is disclosed, which clears these patterns with minimal correction to the image, without any additional denoising, smoothing or sharpening. The disclosed filter gives excellent results, and may completely remove Moire patterns. FIG. 7 is an illustration of a result 710 of the proposed solution, according to an embodiment of the invention, and a typical result 720 of another demosaicing algorithm for a similar test target.

According to an embodiment of the invention, method 500 continues with stage 570 of selectively correcting the luminance value of one or more pixels, wherein a computing of luminance values of the pixels of a subgroup of adjacent pixels is followed by that carrying out of stages 572, 573, potentially 574, and 575.

Conveniently, stage 570 starts with stage 571 of computing the luminance for all the pixels in the subgroup of adjacent pixels. It is noted that the computing of the luminance is conveniently carried out by carrying out stages 530 and 540 for every pixel of the subgroup of adjacent pixels. According to an embodiment of the invention, the subgroup of adjacent pixels consists of 21 pixels arranged as a 5×5 disc of pixels; wherein the center pixel is located at a center of the 5×5 disc (similarly to the subgroup 800 of pixels illustrated in FIG. 8, wherein the center pixel is pixel 11 in the drawing).

Stage 572 includes determining a variance value and offset values for each pattern type of a group of pattern types in response to the luminance values of the pixels of the subgroup of adjacent pixels.

According to an embodiment of the invention in which the subgroup of adjacent pixels consists of 21 pixels arranged as a 5×5 disc of pixels; wherein the center pixel is located at a center of the 5×5 disc, let us define the following sets of pixels (referring to the numbering of pixels offered in FIG. 8):

UpDownLong={P2, P11, P20}
UpDownShort={P6, P16}
LeftRightLong={P9, P11, P13}
LeftRightShort={P10, P12}
LongCross={P2, P9, P11, P13, P20}
ShortCross={P6, P10, P12, P16}
Square={P5, P7, P15, P17}
VertAvenue={P1, P3, P10, P12, P19, P21}
HorAvenue={P4, P6, P8, P14, P16, P18}

Wherein the notation P(i) denotes the computed luminance for i-th pixel.

For that embodiments, the following operators are defined:
Max{S}—the maximal element in S
Min{S}—the minimal element in S
Var{S}=Max{S}−Min{S}
Mean{S}—the average of all elements in S For that embodiments, the following parameters are defined:

Vertical Variance=Max{Var{UpDownLong}, Var{UpDownShort}}
VerticalOffset=Var{Mean{UpDownLong}, Mean{UpDownShort}}
HorizontalVariance=Max{Var{LeftRightLong}, Var{LeftRightShort}}
HorizontalOffset=Var{Mean{LeftRightLong}, Mean{LeftRightShort}}
AreaVariance=Max{Var{LongCross}, Var{Square}, Var{VertAvenue}, Var{HorAvenue}}
AreaOffset=Var {Mean{LongCross}, Mean{Square}, Mean{VertAvenue}, Mean{HorAvenue}}

It is noted that according to an embodiment of the invention the group of pattern types includes at least one linear pattern type and at least one area pattern type. According to such an embodiment of the invention, the group of pattern types includes a horizontal linear pattern type, a vertical linear pattern type, and an area pattern type (e.g. as illustrated in FIG. 6). The above disclosed parameters refer to an embodiment of the invention in which such pattern types are implemented.

The above parameters (or others) are used for the determining of a probable pattern type according to an embodiment of the invention discussed below. clearly, other techniques and/or other parameters may be implemented in other embodiments of the invention for determining a probable pattern type.

Stage 572 is followed by stage 573 of determining, in response to the variance values and the offset values of the pattern types, a probable pattern type. According to an embodiment of the invention, the most probable pattern type is the one of smallest variance. It is noted that, according to an embodiment of the invention, the selection may be biased. For example, according to an embodiment of the invention, more chances may be given for a selection of AreaVariance, by reducing it by a predefined coefficient "Xp" (e.g. Xp=5.0). For example:

MinVariance=Min{VerticalVariance,Horizontal Variance,AreaVariance/$Xp$}

According to such an embodiment of the invention, the pattern type determined as probable is
a. Vertical, if MinVariance=VerticalVariance
b. Horizontal, if MinVariance=HorizontalVariance
c. Area, if MinVariance=AreaVariance/Xp.

According to an embodiment of the invention, stage 573 is followed by stage 574 of evaluating a requisiteness of a correction for the probable pattern type.

It is noted that defects in luminance layer are usually visible only when Offset is significantly greater then Variance. Therefore, according to an embodiment of the invention, if the offset for the center pixel is smaller than $X_k$·Variance, the luminance value for the center pixel is not corrected, wherein $X_k$ is a constant (e.g. $X_k$=0.5 may be used). Continuing the example offered above, the offset of the center pixel is VerticalOffset, HorizontalOffset or AreaOffset, according to the determined probable pattern type; and the Varuance is VerticalVariance, HorizontalVariance or AreaVariance according to the determined probable pattern type. Clearly, other rules for evaluating a requisiteness of a correction may be implemented in other embodiments of the invention.

Stage 570 continues with stage 575 of selectively correcting the luminance value of the center pixel of the subgroup of adjacent pixels. The carrying out of the correcting depends upon a result of the evaluating of stage 574, if implemented.

According to an embodiment of the invention, the selectively correcting of the luminance value of the center pixel of the subgroup includes computing a new luminance value according to the following formulae:

If Vertical pattern:

$L'=L$+(Mean{UpDownLong}+
Mean{UpDownShort})/2−Mean{UpDownLong]

If Horizontal pattern:

$L'=L$+(Mean{LeftRightLong}+
Mean{LeftRightShort})/2−
Mean{LeftRightLong}

If Area pattern:

$L'=L$+(Mean{LongCross}+Mean{Square}+
Mean{VertAvenue}+Mean{HorAvenue})/4−
Mean{LongCross}

Wherein L denoted the luminance value computed at stage 540, and L' denotes the corrected luminance value for the center pixel. It is further noted that once the corrected luminance value was computed, other color parameters—such as new R, G, B values—may be are created for the center pixels. For example: (a) R=L'+C2; (b) G=L'; and (c) B=L'+C1.

According to an embodiment of the invention, method 500 further includes stage 580 of generating a demosaiced image, wherein the colors of at least some of the pixels of the demosaiced images are determined in response to the luminance value and to the at least one chrominance value. It is noted that the colors of some of the pixels of the demosaiced image may be calculated otherwise (e.g. due to missing data resulting from faulty chromatically filtered sensing elements). Furthermore, it is noted that additional processes (usually digital image processing algorithms) may be applied to image information during the generating of the demosaiced image. It is further noted that the demosaiced image may include only a portion of the area of the original image.

Stage 580 may be followed by stage 590 of displaying at least a portion of the demosaiced image, by stage 5100 of further processing of the demosaiced image, by stage 5110 of storing the demosaiced image in a memory unit, or by stage 5120 of transmitting the demosaiced image to an external system, according to some embodiments of the invention.

Returning now to FIGS. 2A and 2B, that illustrate system 200 for demosaicing an image that is acquired by a color sensor, according to different embodiments of the invention. System 200 includes interface 210 for receiving intensity values for pixels of the image; wherein the intensity value of each pixel is indicative of an amount of light that was detected by a chromatically filtered sensing element of the color sensor; and processor 220 configured to: (a) calculate at least one chrominance value for a pixel in response to intensity values of neighboring pixels; and (b) compute a luminance value for the pixel in response to the at least one chrominance value of the pixel and to an intensity value of the pixel; wherein processor 220 is further configured to carry out the calculating and the computing for each pixel of a group of pixels of the image.

It is noted that, according to an embodiment of the invention, system 200 further includes image sensor 230 that is connected to interface 210, wherein the image sensor includes an array of multiple chromatically filtered sensing elements 232, wherein the intensity value of each pixel is indicative of an amount of light that was detected by a chromatically filtered sensing element 232 of the array of multiple chromatically filtered sensing elements. According to such an embodiment of the invention, the image sensor may be a Complementary Metal Oxide Semiconductor (CMOS) image sensor.

It is noted that according to such an embodiment of the invention, system 200 (which may be regarded as a digital camera, or other type of sensor), may further include one or more optical units 240 (or electro-optical units 240) for the projecting of light onto the chromatically filtered sensing element 232. It is noted that color filter array, if implemented, may be regarded as a part of optical unit 240, as a part of the color sensor, or as an intermediate unit.

It is however noted that system 200 does not necessarily include the color sensor, e.g. if system 200 is a personal computer.

According to an embodiment of the invention, interface 210 is for receiving intensity values indicative of light that was detected by chromatically filtered sensing elements of a Bayer color filter array.

According to an embodiment of the invention, processor 220 is configured to calculate the at least one chrominance value by: (a) determining a first chrominance vector that is responsive to differences between intensity values of pixels of each horizontal pair of adjacent pixels out of the neighboring pixels; (b) determining a second chrominance vector that is responsive to differences between intensity values of pixels of each vertical pair of adjacent pixels out of the neighboring pixels; and (c) determining the least one chrominance value in response to the first chrominance vector, to the second chrominance vector, and to gray color reference.

According to an embodiment of the invention, interface 210 is for receiving intensity values indicative of light that was detected by chromatically filtered sensing elements of a Bayer color filter array; wherein processor 220 is further configured to: (a) determine the first chrominance vector by determining the coordinates of the first chrominance vector to be:

$$\overline{C}_{hor} = \left( \frac{1}{n} \sum_{h=1,n} BG_{hor}[h] \cdot \frac{1}{m} \sum_{l=1,m} RG_{hor}[l] \right);$$

(b) determine the second chrominance vector by determining the coordinates of second chrominance vector to be:

$$\overline{C}_{vert} = \left( \frac{1}{p} \sum_{r=1,p} BG_{vert}[r] \cdot \frac{1}{q} \sum_{s=1,q} RG_{vert}[s] \right);$$

wherein for each of n horizontal B-G pairs of the Bayer color filter array included in the neighboring pixels, BGhor[h] is equal to a difference between an intensity value of a B pixel of a B-G pair to an intensity value of a G pixel of the B-G pair, where h is an index of summation ranging from 1 to n; wherein for each of m horizontal R-G pairs of the Bayer color filter array included in the neighboring pixels, RGhor[l] is equal to a difference between an intensity value of a R pixel of a R-G pair to an intensity value of a G pixel of the R-G pair, where l is an index of summation ranging from 1 to m; wherein for each of p vertical B-G pairs of the Bayer color filter array included in the neighboring pixels, BGvert[r] is equal to a difference between an intensity value of a B pixel of a B-G pair to an intensity value of a G pixel of the B-G pair, where r is an index of summation ranging from 1 to p; wherein for each of q vertical R-G pairs of the Bayer color filter array included in the neighboring pixels, RGvert[s] is equal to a difference between an intensity value of a R pixel of a R-G pair to an intensity value of a G pixel of the R-G pair, where s is an index of summation ranging from 1 to q.

According to an embodiment of the invention, the at least one chrominance value is two chrominance values that are two coordinates of a third chrominance vector $$\overline{C}$$

that is defined as a linear combination between the first chrominance vector $$\overline{C}_{hor}$$

and the second chrominance vector $$\overline{C}_{vert},$$

so that $$\overline{C} = \overline{C}_{hor} + k \cdot (\overline{C}_{vert} \cdot \overline{C}_{hor});$$

wherein processor 220 is further configured to calculate the at least one chrominance value by determining a value of a coefficient k∈[0,1], so as to minimize a distance between $$\overline{C}$$

and a gray color reference.

According to an embodiment of the invention, processor 220 is configured to compute the luminance value for the pixel irrespectively of intensity values of other pixels of the image.

According to an embodiment of the invention, interface 210 is for receiving intensity values indicative of light that was detected by chromatically filtered sensing elements of a Bayer color filter array; wherein processor 220 is further configured to determine colors values for pixels according to the following formulae:
 a. for an R pixel, determine G=R−C2 and B=R−C2+C1;
 b. for a B pixel, determine G=B−C1 and R=B−C1+C2;
 c. for a G pixel, determine R=G+C2 and B=G+C1;
  wherein $C_1$ and $C_2$ are coordinates of a third chrominance vector that is determined prior to the determining of the color values of the pixel.

According to an embodiment of the invention, processor 220 is configured to generate an intermediate demosaiced image, in response to the chrominance values and to the luminance values of the pixels of the group of pixels; wherein processor 220 is further configured to apply a denoising algorithm to the intermediate demosaiced image.

According to an embodiment of the invention, processor 220 is further configured to: (a) determine a variance value and offset values for each pattern type of a group of pattern types in response to the luminance values of pixels of a subgroup of adjacent pixels; (b) determine, in response to the variance values and the offset values of the pattern types, a probable pattern type; and (c) selectively correcting the luminance value of a center pixel of the subgroup of adjacent pixels, following a computing of luminance values of the pixels of the subgroup of adjacent pixels.

According to an embodiment of the invention, the group of pattern types comprises at least one linear pattern type and at least one area pattern type.

According to an embodiment of the invention, the subgroup of adjacent pixels consists of 21 pixels arranged as a 5×5 disc of pixels; wherein the center pixel is located at a center of the 5×5 disc.

According to an embodiment of the invention, processor 220 is configured to calculate the at least one chrominance value for a pixel in response to values of neighboring pixels arranged as a 5×5 disc of pixels, wherein the pixel is located at a center of the 5×5 disc.

According to an embodiment of the invention, processor 220 is further configured to generate a demosaiced image, wherein the colors of at least some of the pixels of the demosaiced images are determined in response to the luminance value and to the at least one chrominance value. It is noted that the colors of some of the pixels of the demosaiced image may be calculated otherwise (e.g. due to missing data resulting from faulty chromatically filtered sensing elements). Furthermore, it is noted that additional processes (usually digital image processing algorithms) may be applied to image information during the generating of the demosaiced image. It is further noted that the demosaiced image may include only a portion of the area of the original image.

According to an embodiment of the invention, system 200 further includes display 250 for displaying at least a portion of the demosaiced image. According to an embodiment of the invention, processor 220 is further configured to further process of the demosaiced image. According to an embodiment of the invention, system 200 further includes memory unit 260, wherein processor 220 is further configured to store the demosaiced image in memory unit 260. According to an embodiment of the invention, interface 210 (or another interface of system 200) is further for transmitting the demosaiced image to an external system.

It is again noted that different embodiments of system 200 (and especially processor 220) are adapted to implement the different disclosed embodiments of method 500, even if not explicitly detailed in relation to system 200.

According to an aspect of the invention, a computer readable medium is disclosed, having a computer readable code embodied therein for demosaicing an image that is acquired by a color sensor, the computer readable code including instructions for: (i) receiving intensity values for pixels of the image, and (ii) carrying out, for each pixel of a group of pixels of the image, the stages of: (a) calculating at least one chrominance value for the pixel in response to intensity values of neighboring pixels; and (b) computing a luminance value for the pixel in response to the at least one chrominance value of the pixel and to an intensity value of the pixel; wherein the intensity value of each pixel is indicative of an amount of light that was detected by a chromatically filtered sensing element of the color sensor.

According to an embodiment of the invention, the instructions included in the computer readable code for receiving include instructions for receiving intensity values indicative of light that was detected by chromatically filtered sensing elements of a Bayer color filter array.

According to an embodiment of the invention, the instructions included in the computer readable code for calculating include instructions for: (a) determining a first chrominance vector that is responsive to differences between intensity values of pixels of each horizontal pair of adjacent pixels out of the neighboring pixels; (b) determining a second chrominance vector that is responsive to differences between intensity values of pixels of each vertical pair of adjacent pixels out of the neighboring pixels; and (c) determining the least one chrominance value in response to the first chrominance vector, to the second chrominance vector, and to gray color reference.

According to an embodiment of the invention, the instructions included in the computer readable code for receiving include instructions for receiving intensity values indicative of light that was detected by chromatically filtered sensing elements of a Bayer color filter array; wherein the determining of the first chrominance vector includes determining the coordinates of the first chrominance vector to be:

$$\overline{C}_{hor} = \left( \frac{1}{n} \sum_{h=1,n} BG_{hor}[h] \cdot \frac{1}{m} \sum_{l=1,m} RG_{hor}[l] \right);$$

wherein the determining of the second chrominance vector includes determining the coordinates of the second chrominance vector to be:

$$\overline{C}_{vert} = \left( \frac{1}{p} \sum_{r=1,p} BG_{vert}[r] \cdot \frac{1}{q} \sum_{s=1,q} RG_{vert}[s] \right);$$

wherein for each of n horizontal B-G pairs of the Bayer color filter array included in the neighboring pixels, BGhor[h] is equal to a difference between an intensity value of a B pixel of a B-G pair to an intensity value of a G pixel of the B-G pair, where h is an index of summation ranging from 1 to n; wherein for each of m horizontal R-G pairs of the Bayer color filter array included in the neighboring pixels, RGhor[l] is equal to a difference between an intensity value of a R pixel of a R-G pair to an intensity value of a G pixel of the R-G pair, where l is an index of summation ranging from 1 to m; wherein for each of p vertical B-G pairs of the Bayer color filter array included in the neighboring pixels, BGvert[r] is equal to a difference between an intensity value of a B pixel of a B-G pair to an intensity value of a G pixel of the B-G pair, where r is an index of summation ranging from 1 to p; wherein for each of q vertical R-G pairs of the Bayer color filter array included in the neighboring pixels, RGvert[s] is equal to a difference between an intensity value of a R pixel of a R-G pair to an intensity value of a G pixel of the R-G pair, where s is an index of summation ranging from 1 to q.

According to an embodiment of the invention, the at least one chrominance value is two chrominance values that are two coordinates of a third chrominance vector $$\overline{C}$$

that is defined as a linear combination between the first chrominance vector $$\overline{C}_{hor}$$

and the second chrominance vector $$\overline{C}_{vert},$$

so that $$\overline{C} = \overline{C}_{hor} + k \cdot (\overline{C}_{vert} - \overline{C}_{hot});$$

wherein the instructions included in the computer readable code for calculating include instructions for determining a value of a coefficient k∈[0,1], so as to minimize a distance between $$\overline{C}$$

and a gray color reference.

According to an embodiment of the invention, the instructions included in the computer readable code for computing include instructions for computing the luminance value for the pixel irrespectively of intensity values of other pixels of the image.

According to an embodiment of the invention, the instructions included in the computer readable code for receiving include instructions for receiving intensity values indicative of light that was detected by chromatically filtered sensing elements of a Bayer color filter array; wherein the computer readable code further includes instructions for determining colors values for pixels according to the following formulae:
   a. for an R pixel, determine G=R−C2 and B=R−C2+C1;
   b. for a B pixel, determine G=B−C1 and R=B−C1+C2;
   c. for a G pixel, determine R=G+C2 and B=G+C1;
     wherein $C_1$ and $C_2$ are coordinates of a third chrominance vector that is determined prior to the determining of the color values of the pixel.

According to an embodiment of the invention, the computer readable code includes instructions for generating an intermediate demosaiced image in response to the chrominance values and to the luminance values of the pixels of the group of pixels, and for applying, following the generating, a denoising algorithm to the demosaiced image.

According to an embodiment of the invention, wherein the computer readable code further includes instructions for determining, following a computing of luminance values of the pixels of a subgroup of adjacent pixels, a variance value and offset values for each pattern type of a group of pattern types in response to the luminance values of the pixels of the subgroup of adjacent pixels; for determining, in response to the variance values and the offset values of the pattern types, a probable pattern type; and for selectively correcting the luminance value of a center pixel of the subgroup of adjacent pixels.

According to an embodiment of the invention, the group of pattern types includes at least one linear pattern type and at least one area pattern type.

According to an embodiment of the invention, the subgroup of adjacent pixels consists of 21 pixels arranged as a 5×5 disc of pixels; wherein the center pixel is located at a center of the 5×5 disc.

According to an embodiment of the invention, the instructions included in the computer readable code for calculating include instructions for calculating the at least one chrominance value for the pixel in response to values of neighboring pixels arranged as a 5×5 disc of pixels, wherein the pixel is located at a center of the 5×5 disc.

According to an embodiment of the invention, the computer readable code further includes instructions for generating a demosaiced image, wherein the colors of at least some of the pixels of the demosaiced images are determined in response to the luminance value and to the at least one chrominance value. It is noted that the colors of some of the pixels of the demosaiced image may be calculated otherwise (e.g. due to missing data resulting from faulty chromatically filtered sensing elements). Furthermore, it is noted that additional processes (usually digital image processing algorithms) may be applied to image information during the generating of the demosaiced image. It is further noted that the demosaiced image may include only a portion of the area of the original image.

According to an embodiment of the invention, the computer readable code further includes instructions for displaying at least a portion of the demosaiced image. According to an embodiment of the invention, the computer readable code further includes instructions for further processing of the demosaiced image. According to an embodiment of the invention, the computer readable code further includes instructions for storing the demosaiced image in a memory unit. According to an embodiment of the invention, the computer readable code further includes instructions for transmitting the demosaiced image to an external system.

It is noted that additional embodiments of the computer readable medium further includes computer readable code for implementing the different embodiments of method 500, even if not explicitly so detailed in relation to the computer readable medium.

The present invention can be practiced by employing conventional tools, methodology and components. Accordingly, the details of such tools, component and methodology are not set forth herein in detail. In the previous descriptions, numerous specific details are set forth, in order to provide a thorough understanding of the present invention. However, it should be recognized that the present invention might be practiced without resorting to the details specifically set forth.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

I claim:

1. A method for demosaicing an image that is acquired by a color sensor, the method comprises:
   receiving intensity values for pixels of the image, and carrying out, for each pixel of a group of pixels of the image, the stages of:
   calculating at least one chrominance value for the pixel in response to intensity values of neighboring pixels; and
   computing a luminance value for the pixel in response to the at least one chrominance value of the pixel and to an intensity value of the pixel;
   wherein the intensity value of each pixel is indicative of an amount of light that was detected by a chromatically filtered sensing element of the color sensor;
wherein the calculating comprises:
   determining a first chrominance vector that is responsive to differences between intensity values of pixels of each horizontal pair of adjacent pixels out of the neighboring pixels;
   determining a second chrominance vector that is responsive to differences between intensity values of pixels of each vertical pair of adjacent pixels out of the neighboring pixels; and
   determining the least one chrominance value in response to the first chrominance vector, to the second chrominance vector, and to gray color reference.

2. The method according to claim 1, comprising receiving intensity values indicative of light that was detected by chromatically filtered sensing elements of a Bayer color filter array;
   wherein the determining of the first chrominance vector comprises determining the coordinates of the first chrominance vector to be:

$$\overline{C_{hot}} = \left( \frac{1}{n} \sum_{h=1-n} BG_{hor}[h], \frac{1}{m} \sum_{l=1-m} RG_{hor}[l] \right);$$

wherein the determining of the second chrominance vector comprises determining the coordinates of the second chrominance vector to be:

$$\overline{C_{vert}} = \left( \frac{1}{p} \sum_{r=1\cdot p} BG_{vert}[r], \frac{1}{q} \sum_{o=1-q} RG_{vert}[s] \right);$$

wherein for each of n horizontal B-G pairs of the Bayer color filter array included in the neighboring pixels, $BG_{hor}[h]$ is equal to a difference between an intensity value of a B pixel of a B-G pair to an intensity value of a G pixel of the B-G pair, where h is an index of summation ranging from 1 to n;

wherein for each of m horizontal R-G pairs of the Bayer color filter array included in the neighboring pixels, $RG_{hor}[l]$ is equal to a difference between an intensity value of a R pixel of a R-G pair to an intensity value of a G pixel of the R-G pair, where l is an index of summation ranging from 1 to m;

wherein for each of p vertical B-G pairs of the Bayer color filter array included in the neighboring pixels, $BG_{vert}[r]$ is equal to a difference between an intensity value of a B pixel of a B-G pair to an intensity value of a G pixel of the B-G pair, where r is an index of summation ranging from 1 to p;

wherein for each of q vertical R-G pairs of the Bayer color filter array included in the neighboring pixels, $RG_{vert}[s]$ is equal to a difference between an intensity value of a R pixel of a R-G pair to an intensity value of a G pixel of the R-G pair, where s is an index of summation ranging from 1 to q.

3. The method according to claim 1, wherein the chrominance values are two coordinates of a third chrominance vector $$\overline{C}$$

that is defined as a linear combination between the first chrominance vector $$\overline{C_{hor}}$$

and the second chrominance vector $$\overline{C_{vert}},$$

so that $$\overline{C} = \overline{C_{hor}} + k \cdot (\overline{C_{vert}} \cdot \overline{C_{hor}});$$

wherein the calculating comprises determining a value of a coefficient k∈[0,1], so as to minimize a distance between $$\overline{C}$$

and a gray color reference.

4. A method for demosaicing an image that is acquired by a color sensor, the method comprises:
receiving intensity values for pixels of the image, and carrying out, for each pixel of a group of pixels of the image, the stages of:
calculating at least one chrominance value for the pixel in response to intensity values of neighboring pixels; and
computing a luminance value for the pixel in response to the at least one chrominance value of the pixel and to an intensity value of the pixel;
wherein the intensity value of each pixel is indicative of an amount of light that was detected by a chromatically filtered sensing element of the color sensor; wherein the method comprises receiving intensity values indicative of light that was detected by chromatically filtered sensing elements of a Bayer color filter array; and determining colors values for pixels according to the following formulae:
for an R pixel, determine $G=R-C_2$ and $B=R-C_2+C_1$;
for a B pixel, determine $G=B-C_1$ and $R=B-C1+C_2$;
for a G pixel, determine $R=G+C_2$ and $B=G+C_1$;
wherein $C_1$ and $C_2$ are coordinates of a third chrominance vector that is determined prior to the determining of the color values of the pixel.

5. A method for demosaicing an image that is acquired by a color sensor, the method comprises:
receiving intensity values for pixels of the image, and carrying out, for each pixel of a group of pixels of the image, the stages of:
calculating at least one chrominance value for the pixel in response to intensity values of neighboring pixels; and
computing a luminance value for the pixel in response to the at least one chrominance value of the pixel and to an intensity value of the pixel;
wherein a computing of luminance values of the pixels of a subgroup of adjacent pixels is followed by:
determining a variance value and offset values for each pattern type of a group of pattern types in response to the luminance values of the pixels of the subgroup of adjacent pixels;
determining, in response to the variance values and the offset values of the pattern types, a probable pattern type; and
selectively correcting the luminance value of a center pixel of the subgroup of adjacent pixels.

6. The method according to claim 5, wherein the group of pattern types comprises at least one linear pattern type and at least one area pattern type.

7. The method according to claim 5, wherein the subgroup of adjacent pixels consists of 21 pixels arranged as a 5×5 disc of pixels; wherein the center pixel is located at a center of the 5×5 disc.

8. A system for demosaicing an image that is acquired by a color sensor, the system comprises:
an interface for receiving intensity values for pixels of the image; wherein the intensity value of each pixel is indicative of an amount of light that was detected by a chromatically filtered sensing element of the color sensor; and
a processor configured to: (a) calculate at least one chrominance value for a pixel in response to intensity values of neighboring pixels; and (b) compute a luminance value for the pixel in response to the at least one chrominance value of the pixel and to an intensity value of the pixel; wherein the processor is further configured to carry out the calculating and the computing for each pixel of a group of pixels of the image; wherein the processor is configured to calculate the at least one chrominance value by: (a) determining a first chrominance vector that is responsive to differences between intensity values of pixels of each horizontal pair of adjacent pixels out of the neighboring pixels; (b) determining a second chrominance vector that is responsive to differences between intensity values of pixels of each vertical pair of adjacent pixels out of the neighboring pixels; and (c) determining the least one chrominance value in response to the first chrominance vector, to the second chrominance vector, and to gray color reference.

9. The system according to claim 8, wherein the interface is for receiving intensity values indicative of light that was detected by chromatically filtered sensing elements of a Bayer color filter array; wherein the processor is further configured to: (a) determine the first chrominance vector by determining the coordinates of the first chrominance vector to be:

$$\overline{C_{hor}} = \left(\frac{1}{n}\sum_{h=1-n} BG_{hor}[h], \frac{1}{m}\sum_{l=1-m} RG_{hor}[l]\right);$$

(b) determine the second chrominance vector by determining the coordinates of second chrominance vector to be:

$$\overline{C_{vert}} = \left(\frac{1}{p}\sum_{r=1\cdot p} BG_{vert}[r], \frac{1}{q}\sum_{s=1-q} RG_{vert}[s]\right);$$

wherein for each of n horizontal B-G pairs of the Bayer color filter array included in the neighboring pixels, $BG_{hor}[h]$ is equal to a difference between an intensity value of a B pixel of a B-G pair to an intensity value of a G pixel of the B-G pair, where h is an index of summation ranging from 1 to n;

wherein for each of m horizontal R-G pairs of the Bayer color filter array included in the neighboring pixels, $RG_{hor}[l]$ is equal to a difference between an intensity value of a R pixel of a R-G pair to an intensity value of a G pixel of the R-G pair, where l is an index of summation ranging from 1 to m;

wherein for each of p vertical B-G pairs of the Bayer color filter array included in the neighboring pixels, $BG_{vert}[r]$ is equal to a difference between an intensity value of a B pixel of a B-G pair to an intensity value of a G pixel of the B-G pair, where r is an index of summation ranging from 1 to p;

wherein for each of q vertical R-G pairs of the Bayer color filter array included in the neighboring pixels, $RG_{vert}[s]$ is equal to a difference between an intensity value of a R pixel of a R-G pair to an intensity value of a G pixel of the R-G pair, where s is an index of summation ranging from 1 to q.

10. The system according to claim 8, wherein the at least one chrominance value is two chrominance values that are two coordinates of a third chrominance vector $$\overline{C}$$

that is defined as a linear combination between the first chrominance vector $$\overline{C_{hor}}$$

and the second chrominance vector $$\overline{C_{vert}},$$

so that $$\overline{C} = \overline{C_{hor}} + k \cdot (\overline{C_{vert}} \cdot \overline{C_{hor}});$$

wherein the processor is further configured to calculate the at least one chrominance value by determining a value of a coefficient $k \in [0,1]$, so as to minimize a distance between $\overline{c}$ and a gray color reference.

11. A system for demosaicing an image that is acquired by a color sensor, the system comprises:

an interface for receiving intensity values for pixels of the image; wherein the intensity value of each pixel is indicative of an amount of light that was detected by a chromatically filtered sensing element of the color sensor; and a processor configured to: (a) calculate at least one chrominance value for a pixel in response to intensity values of neighboring pixels; and (b) compute a luminance value for the pixel in response to the at least one chrominance value of the pixel and to an intensity value of the pixel; wherein the processor is further configured to carry out the calculating and the computing for each pixel of a group of pixels of the image; wherein the interface is for receiving intensity values indicative of light that was detected by chromatically filtered sensing elements of a Bayer color filter array; wherein the processor is further configured to determine colors values for pixels according to the following formulae:

for an R pixel, determine $G=R-C_2$ and $B=R-C_2+C_1$;

for a B pixel, determine $G=B-C_1$ and $R=B-C1+C_2$;

for a G pixel, determine $R=G+C_2$ and $B=G+C_1$;

wherein $C_1$ and $C_2$ are coordinates of a third chrominance vector that is determined prior to the determining of the color values of the pixel.

12. A system for demosaicing an image that is acquired by a color sensor, the system comprises:

an interface for receiving intensity values for pixels of the image; wherein the intensity value of each pixel is indicative of an amount of light that was detected by a chromatically filtered sensing element of the color sensor; and a processor configured to: (a) calculate at least one chrominance value for a pixel in response to intensity values of neighboring pixels; and (b) compute a luminance value for the pixel in response to the at least one chrominance value of the pixel and to an intensity value of the pixel; wherein the processor is further configured to carry out the calculating and the computing for each pixel of a group of pixels of the image;

wherein the processor is further configured to: (a) determine a variance value and offset values for each pattern type of a group of pattern types in response to the luminance values of pixels of a subgroup of adjacent pixels; (b) determine, in response to the variance values and the offset values of the pattern types, a probable pattern type; and (c) selectively correcting the luminance value of a center pixel of the subgroup of adjacent pixels, following a computing of luminance values of the pixels of the subgroup of adjacent pixels.

13. The system according to claim 12, wherein the group of pattern types comprises at least one linear pattern type and at least one area pattern type.

14. The system according to claim 12, wherein the subgroup of adjacent pixels consists of 21 pixels arranged as a 5×5 disc of pixels; wherein the center pixel is located at a center of the 5×5 disc.

* * * * *